US006993725B2

(12) United States Patent
Somashekaraiah

(10) Patent No.: US 6,993,725 B2
(45) Date of Patent: Jan. 31, 2006

(54) DISPLAY DEVICE AND OSD CONTROLLING METHOD FOR THE SAME

(75) Inventor: Prabhakar Kallanayakanahalli Somashekaraiah, Suwon (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 612 days.

(21) Appl. No.: 09/983,072

(22) Filed: Oct. 23, 2001

(65) Prior Publication Data

US 2002/0080188 A1    Jun. 27, 2002

(30) Foreign Application Priority Data

Dec. 27, 2000   (KR) ............................... 2000-83358

(51) Int. Cl.
*G06F 3/14*    (2006.01)
*H04N 5/445*   (2006.01)

(52) U.S. Cl. ................. 715/811; 715/722; 715/767; 715/835; 715/765; 345/160; 348/569; 348/563

(58) Field of Classification Search ........ 345/764–765, 345/745, 719, 767, 810, 811, 825–826, 835, 345/866, 160, 157, 168; 715/764–765, 719, 715/745, 767, 835, 810–811, 825–826, 866, 715/858, 722; 348/563–564, 569
See application file for complete search history.

(56) References Cited

U.S. PATENT DOCUMENTS

| 5,243,697 A | | 9/1993 | Hoeber et al. ............. 395/156 |
| 5,790,122 A | * | 8/1998 | Cecchini et al. ............ 345/854 |
| 5,805,167 A | * | 9/1998 | van Cruyningen .......... 345/808 |
| 6,266,060 B1 | * | 7/2001 | Roth ........................... 345/853 |
| 6,342,908 B1 | * | 1/2002 | Bates et al. ................ 345/798 |
| 6,583,797 B1 | * | 6/2003 | Roth ........................... 715/810 |
| 6,613,100 B2 | * | 9/2003 | Miller ........................ 715/526 |

FOREIGN PATENT DOCUMENTS

| JP | 05-260555 | 10/1993 |
| JP | 08-140003 | 5/1996 |
| JP | 08-186774 | 7/1996 |
| JP | 11-126054 | 5/1999 |

* cited by examiner

*Primary Examiner*—Raymond J. Bayerl
(74) *Attorney, Agent, or Firm*—Robert E. Bushnell, Esq.

(57) ABSTRACT

Disclosed is a display device including a display section for displaying a video signal, comprising: an OSD generating section adapted to generate a menu matrix having a plurality of menu icons arranged in a plurality of rows and columns forming a matrix shape to display the generated menu matrix on the display section, the plurality of menu icons being adapted to adjust the display state of the display section; a key inputting section adapted to allow a user to select any desired one of the plurality of menu icons; and a control section adapted to control a pointer so that the pointer is positioned at a menu icon in the central region of the menu matrix upon the initial display of the menu matrix, the pointer indicating a menu icon selected through the key inputting section, and the control section adapted to vary the display state of the display section according to an input signal from the key inputting section. According to the present invention, a pointer is positioned at the central region of the menu matrix upon the initial display of the menu matrix of an OSD to minimize the frequency of selection of the key inputting section, whereby the display state of the display section can be adjusted conveniently.

18 Claims, 4 Drawing Sheets

DISPLAY DEVICE AND OSD CONTROLLING METHOD FOR THE SAME

CLAIM OF PRIORITY

This application makes reference to, incorporates the same herein, and claims all benefits accruing under 35 U.S.C §119 from an application entitled Display And OSD Controlling Method Thereof earlier filed in the Korean Industrial Property Office on 27, Dec. 2000, and there duly assigned Serial No. 2000-83358 by that Office.

BACKGROUND OF THE INVENTION

1. Field of the Invention

The present invention relates to a display device and OSD (On Screen Display) controlling method for the display device, and more particularly, a display device and OSD controlling method for the display device which can easily achieve a desired adjustment for display parameters using minimized key inputs.

2. Description of the Related Art

In general, a monitor, which is used as a display device in a computer to output data generated from the computer, is largely classified into a CRT (Cathode Ray Tube) monitor and an LCD (Liquid Crystal Display) monitor.

Some such monitors have an OSD function for displaying adjustment information for adjusting the display of a video signal transmitted from the computer as well as information about the monitor. The OSD activated on the monitor includes a plurality of menus for altering information associated with a shape, a color, etc., of the display or information about the video signal on the screen thereof.

A monitor being contemplated by the Assignee of the present invention having such an OSD function includes a control section for receiving a video signal output from a video card of a computer and for receiving horizontal and vertical synchronizing signals to discriminate a resolution, a key inputting section for generating a control signal for controlling a monitor screen, a horizontal and vertical outputting circuit for receiving the horizontal and vertical synchronizing signals and a monitor controlling signal output from the control section to synchronize a raster, a video signal processing section for amplifying the video signal for application to the monitor which displays the amplified video signal thereon, an OSD generating section for processing OSD data applied thereto from the control section to generate an OSD, and a power supply circuit for supplying electric power to the control section, the horizontal and vertical outputting circuit, and the video signal processing section.

The key inputting section includes a menu key for activating an OSD on a monitor screen, four directional keys, i.e., UP/DOWN/LEFT/RIGHT keys for moving a pointer indicated on the display window of the OSD to select a desired menu and/or adjusting the selected menu, and an end key for closing the OSD or replacing a present menu with an upper menu.

Where it is desired to adjust a display state of this monitor, when a user inputs the menu key of the key inputting section, the menus of the OSD are displayed on the screen thereof. An example of the monitor being contemplated by the Assignee of the present invention is shown in FIG. 4, wherein an OSD 70 includes a menu matrix 71 having a plurality of menu icons arranged in a pair of rows and a plurality of columns forming a matrix shape, and a display window 73 for displaying an adjusted display state associated with a selected one of the menu icons or sub-menus of the selected menu icon. Each menu icon of the menu matrix 71 indicates information about the video signal or information about the image state of a display section. Here, for convenience's sake, the leftmost menu icon of an upper row of the menu matrix 71 is designated as icon 1. Then, the remaining menu icons of the upper row are designated as icon 2, icon 3, . . . , and icon 7, respectively, in regular order from icon 1 to the right side. Similarly, the leftmost menu icon of a lower row of the menu matrix 71 is designated as icon 8, and the remaining menu icons of the lower row are also designated as icon 9, icon 10, . . . , and icon 14, respectively, in regular order from icon 8 to the right side. As a result, the rightmost menu icon of the lower row thereof becomes icon 14. The number indicated at the upper left end side of each menu icon represents the frequency of a minimum selection of the directional keys for moving the pointer from the initial (default) position thereof to a corresponding menu icon. For example, the default icon is icon 1 for adjusting brightness and in order to move to icon 2 for adjusting the contrast the user must press the right directional key once, however, if the user desires to adjust the frequency, icon 14, the user must press the left directional key once for moving the pointer from icon 1 to icon 14. To move from icon 1 to icon 7, the user presses the down key once and the left key once, thus the minimum number of times the directional keys for moving the pointer from the initial (default) position of icon 1 to icon 7 need to be pressed is two times.

More specifically, when the OSD 70 is activated, the pointer is positioned at the leftmost menu icon of the upper row of the menu matrix 71, which is called "the initial (default) position of the pointer". The pointer is moved up and down or left and right in the menu matrix 71 according to the selection of the directional keys. At this point, the pointer is shifted along with a movement path on a closed loop formed up/down or left/right. That is, for example, when the LEFT key is selected in a state in which the pointer is positioned at icon 1, the pointer is moved from icon 1 to icon 14, and when the RIGHT key is selected in a state in which the pointer is positioned at icon 7, the pointer is moved from icon 7 to icon 8. Similarly, when the UP key is selected in a state in which the pointer is positioned at icon 1, the pointer is moved from icon 1 to icon 14, and when the DOWN key is selected in a state in which the pointer is positioned at icon 8, the pointer is moved from icon 8 to icon 2.

When the OSD 70 is displayed on a monitor screen to vary information about a monitor and a video signal using such a conventional OSD 70, the pointer is initially positioned at icon 1 or the leftmost menu icon of the upper row of the menu matrix 71. At this time, if a menu icon indicating a menu that a user desires to vary is icon 13, when the user depresses the LEFT key twice, the pointer reaches icon 13 immediately. However, since most users are accustomed to using the RIGHT key rather than the LEFT key, they depress the RIGHT key six times and then depresses the DOWN key once habitually to move the pointer from icon 1 to icon 13. As a result, the frequency of selection of the RIGHT key becomes larger than that of selection of the LEFT key by 5. Also, since a user feels icon 13 is at a far distance from icon 1 on the menus matrix 71 of the OSD 70, he/she feels inconvenienced by having to depressing the directional keys many times when moving the pointer from icon 1 to icon 13.

Meanwhile, the menu icons arranged on the menu matrix 71 of the OSD 70 are determined randomly upon the production of a monitor in consideration of the frequency of use, but a menu icon having a higher frequency of use is not equally applied to all the users. Accordingly, there have been proposed several methods in which a user can arrange the menu icons randomly or the menu icons are automatically arranged depending on the frequency of use. However, there has been a problem that only a simple rearrangement of the menu icons cannot satisfy the demand and convenience of the user sufficiently.

Accordingly, I have determined that there is a need for an improved arrangement of the menus of the OSD 70 and pointer shifting method in which a user feels that it is convenient and easy for him/her to choose the menu icons visually and which substantially satisfies the demand and convenience of the user.

SUMMARY OF THE INVENTION

Therefore, the present invention has been made in view of the above-mentioned problems, and it is an object of the present invention to provide a display device for displaying menu data of an OSD having a menu matrix arranged on the screen and OSD controlling method for the display device, thereby satisfying the demand and convenience of a user.

According to an aspect of the present invention, there is provided a display device including a display section for displaying a video signal, comprising:

an OSD generating section adapted to generate a menu matrix having a plurality of menu icons arranged in a plurality of rows and columns forming a matrix shape to display the generated menu matrix on the display section, the plurality of menu icons being adapted to adjust the display state of the display section;

a key inputting section adapted to allow a user to select any desired one of the plurality of menu icons; and a control section adapted to control a pointer so that the pointer is positioned at a menu icon in the central region of the menu matrix upon the initial display of the menu matrix, the pointer indicating a menu icon selected through the key inputting section, and the control section adapted to vary the display state of the display section according to an input signal from the key inputting section.

Preferably, the plurality of rows in the menu matrix may include at least three rows.

It is preferred that the control section determines the frequency of use for each of the menu icons selected by a user via the key inputting section, and disposes the menu icon having the highest frequency of use at a central region of the menu matrix where the pointer is initially positioned, so that the pointer is positioned at the menu icon having the highest frequency of use upon the initial display of the menu matrix.

It is also preferred that the control section disposes the remaining menu icons at right/up/left/down sides, in this order, around the central region of the menu matrix so that those of the menu icons having higher frequencies of use are arranged closer to the central region of the menu matrix than those of the menu icons having lower frequencies of use, whereby the number of selections of the key inputting section required to select a desired one of the menu icons is minimized.

Preferably, when the key input section is selected to move the pointer from one of the rightmost menu icons in a right direction, the control section moves the pointer to a menu icon requiring the number of selections of the key input section less than that of the rightmost menu icon while being arranged opposite to the rightmost menu icon with reference to the central region and in a row next to that of the rightmost menu icon in a predetermined direction, whereby the pointer can be moved to be closer to the central region of the menu matrix.

Preferably, when the key input section is selected to move the pointer from one of the leftmost menu icons in a left direction, the control section moves the pointer to a menu icon requiring the number of selections of the key input section less than that of the leftmost menu icon while being arranged opposite to the leftmost menu icon with reference to the central region and in a row next to that of the leftmost menu icon in a predetermined direction, whereby the pointer can be moved to be closer to the central region of the menu matrix.

According to another aspect of the present invention, there is also provided an OSD controlling method of a display device including a display section for displaying a video signal, comprising the steps of:

generating an OSD including a menu matrix having a plurality of menu icons arranged in a plurality of rows and columns forming a matrix shape for adjusting the display state of the display section by means of a selection of a user; and controlling a pointer for indicating a menu icon selected by the user so that the pointer is positioned at a menu icon in the central region of the menu matrix upon the initial display of the menu matrix.

BRIEF DESCRIPTION OF THE DRAWINGS

The foregoing and other objects, features and advantages of the present invention will become more apparent from the following detailed description when taken in conjunction with the accompanying drawings in which.

DETAILED DESCRIPTION OF THE PREFERRED EMBODIMENT

Reference will now be made in detail to the preferred embodiments of the present invention.

Figure 1:
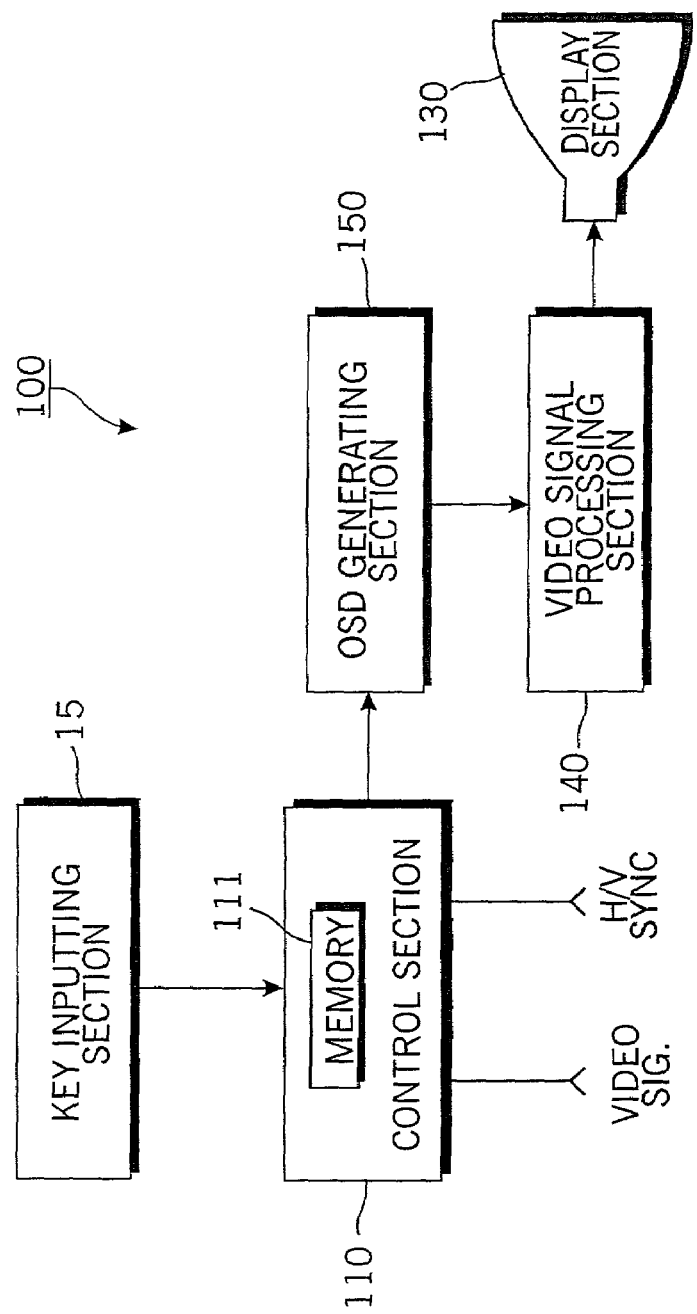
FIG. 1 is a block diagram illustrating the construction of a display device.
Figure 2:
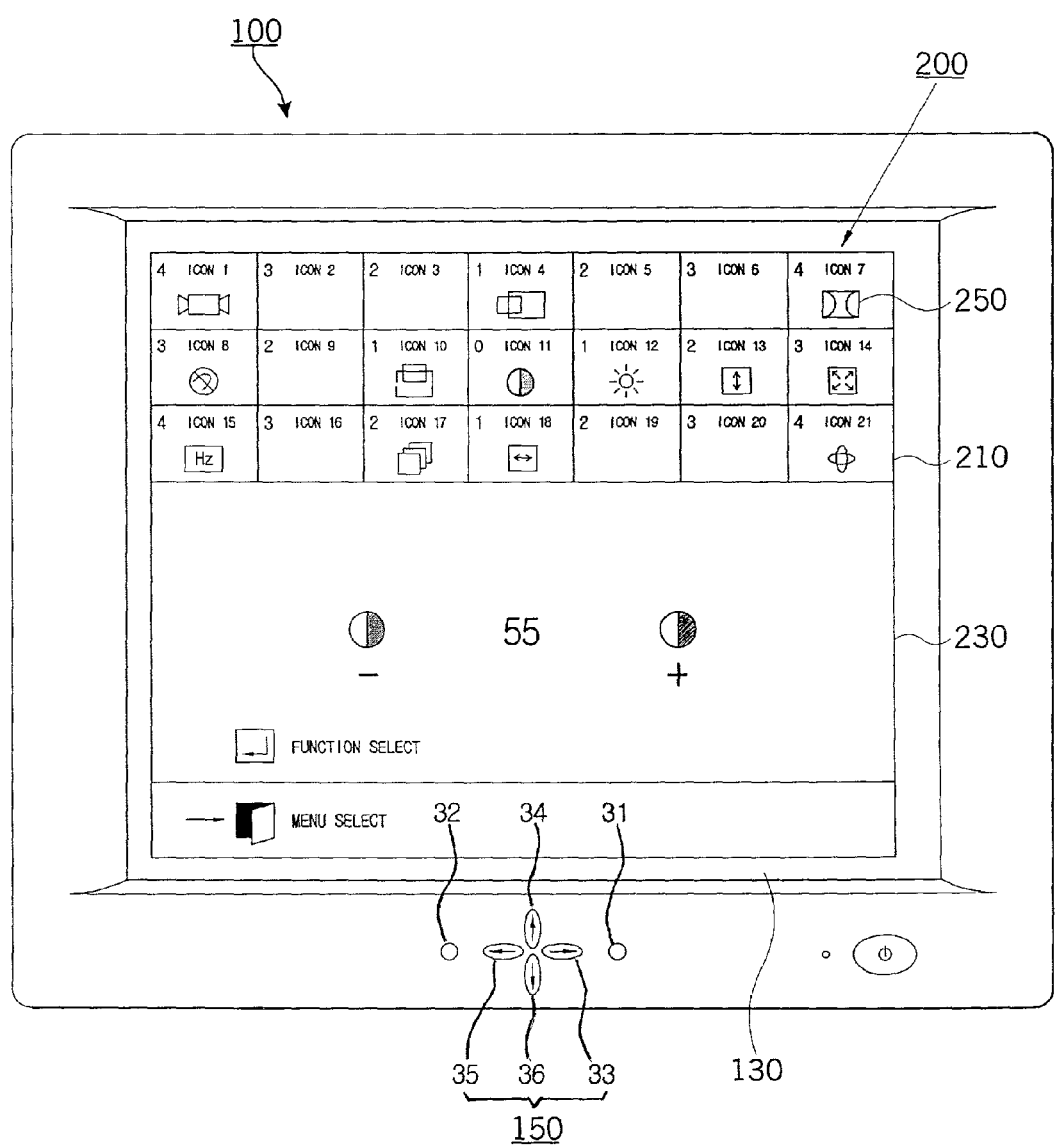
FIG. 2 is a plan view illustrating a display device having an OSD activated thereon according to the present invention.

Referring to FIGS. 1 and 2, there is shown a display device including a display device 100 constituting an appearance of the display device, and a display section 130 as a screen for displaying a video signal. The display device 100 has a key inputting section 115 formed at one side thereof.

The key inputting section includes a menu key 31 for activating an OSD 200 on display section 130, four directional keys, i.e., UP/DOWN/LEFT/RIGHT keys 34, 36, 35, and 33, respectively, for moving a pointer indicated on the OSD 200 to select a desired menu icon and/or adjusting the selected menu, and an end(exit) key 32 for closing the OSD 200 or replacing a present menu with an upper menu.

As shown in FIG. 1, in order to control a function of OSD 200, such a display device 100 includes a control section 110 for receiving a video signal outputted from a video card (not shown) of a computer (not shown) and a horizontal synchronizing signal/a vertical synchronizing signal to discriminate a resolution as well as for adjusting the video signal according to a key input from key inputting section 115 upon the generation of OSD 200, an OSD generating section 150 for processing OSD data applied thereto from control section 110 to generate OSD 200, and a video signal processing section 140 for amplifying a video signal and an OSD signal applied thereto from OSD generating section 150 for application to display section 130 which displays the amplified video/OSD signals thereon.

The OSD 200 generated from OSD generating section 150 includes a menu matrix 210 having a plurality of menu icons 250 arranged in at least three rows and a plurality of columns forming a matrix shape, the menu icons being adapted to adjust the video signal and the image state of display section 130, and a display window 230 for displaying an adjusted display state associated with a selected one of the menu icons or sub-menus of the selected menu icon.

The control section 110 acts to control a pointer so that the pointer is positioned at the initial (default) menu icon (e.g., icon 11 in FIG. 2) in the central region of the menu matrix 210 upon the generation of the OSD 200, and to move the pointer to vary the display state of the display section 130 according to a key input signal from the key inputting section 115. As the pointer is disposed in the central region of the menu matrix 210 upon the initial display of the menu matrix of the OSD 200, a user can move the pointer from the default menu icon in the central region of the menu matrix 210 up, down, left or right. Accordingly, where the pointer is moved to the surrounding menu icons 250 at an equal distance from the default menu icon in the central region of the menu matrix 210, the frequency of selection of the directional keys required for moving the pointer from the default menu icon in the central region thereof to each of the surrounding menu icons becomes equal.

A concrete embodiment of the OSD 200 with the menu matrix 210 on which the pointer is positioned in such a method will now be described hereinafter with reference to FIG. 3.

Figure 3:
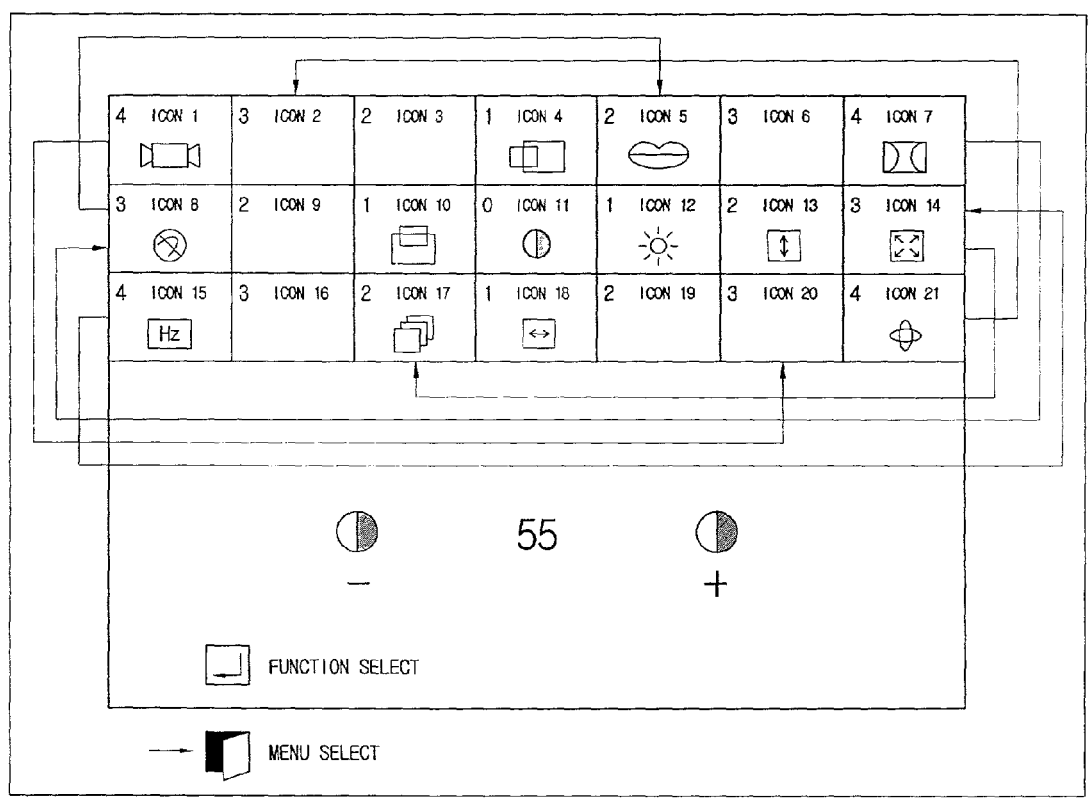
FIG. 3 is a view illustrating the construction of an OSD indicating the shift direction of a pointer according to a selection of a key inputting section of FIG. 1.

As shown in FIG. 3, where the OSD 200 includes a menu matrix 210 having 21 menu icons arranged in three row and seven columns, the initial position of the pointer in the menu matrix 210 becomes icon 11 upon the activation of the OSD 200. Where a user desires to move the pointer from the icon 11 to the surrounding menu icons 250, i.e., up/down/left/right icons 4, 18, 10 and 12 at an equal distance from the icon 11, respectively, when he/she depresses the UP key 34, the DOWN key 36, the LEFT key 35 and RIGHT key 33 once, respectively, in a state in which the pointer is positioned at icon 11, the pointer is moved from icon 11 to icons 4, 18, 10 and 12, respectively. Also, where a user desires to move the pointer from the icon 111 to any of icons 3, 5, 9, 13, 17 and 19, then only two selections of directional keys 33, 34, 35 and 36 are required, e.g., UP/LEFT, UP/RIGHT, LEFT/LEFT, RIGHT/RIGHT, DOWN/LEFT and DOWN/RIGHT, respectively. The number indicated at the upper left end side of each of the menu icons 250 represents the frequency of selection of the directional keys required for moving the pointer from the initial position thereof, i.e., icon 11 to a corresponding menu icons 250.

Figure 4:
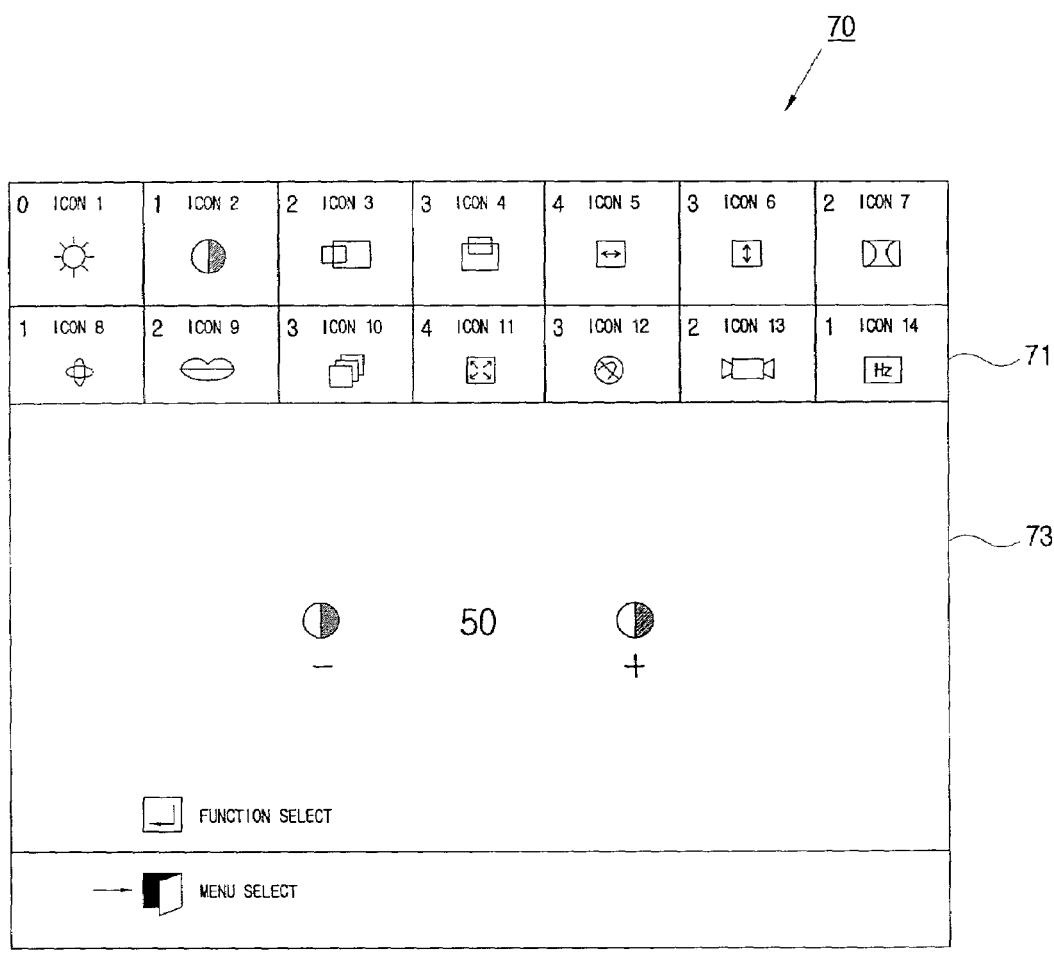
FIG. 4 is a view illustrating a background art display device having an OSD activated thereon.

If the process of shifting the pointer using the directional keys was the same as that described for FIG. 4, where the pointer is positioned at one of the leftmost menu icons 250 of the menu matrix 210 such as icon 1, icon 8 or icon 15, respectively, when a user depresses the LEFT key 35, the pointer would have been moved from icon 1 to icon 21, from icon 8 to icon 7, or from icon 15 to icon 14, respectively. However, for the display device according to the present invention, when a corresponding one of the directional keys is selected to move the pointer from one of the leftmost or rightmost menu icons 250 of the menu matrix 210 in outer directions, i.e., in the left or right directions in the menu matrix 210, the control section 110 moves the pointer from one of the leftmost or rightmost menu icons to a menu icon requiring a number of selections of the key input section one less than that of the leftmost or rightmost menu icon.

That is, when the UP key 34 or LEFT key 35 is selected in a state in which the pointer is positioned at icon 1, i.e., the leftmost menu icon of the first row of the menu matrix 210, since the minimum combined frequency of selection of the directional keys to reach icon 1 from icon 11 is 4, the pointer is not moved from icon 1 to icon 21, because the minimum combined frequency of selection of the directional keys to reach icon 21 from icon 11 is also 4. Instead, but the control section 110 moves the pointer from icon 1 to icon 20, because the minimum combined frequency of selection of the directional keys to reach icon 20 from icon 11 is 3 which is one less than the 4 of icon 1.

Also, when the LEFT key 35 is selected in a state in which the pointer is positioned at icon 8, i.e., the leftmost menu icon of the second row of the menu matrix 210, since the because minimum combined frequency of selection of the directional keys to reach icon 8 from icon 11 is 3, the control section 110 does not move the pointer from icon 8 to icon 7, but instead moves the pointer from icon 8 to icon 5 because the minimum combined frequency of selection of the directional keys to reach icon 5 from icon 11 is 2, which is one less than that required for icon 8.

When the LEFT key 35 or DOWN key 36 is selected in a state in which the pointer is positioned at icon 15, i.e., the leftmost menu icon of the third row of the menu matrix 210, since the minimum combined frequency of selection of the directional keys to reach icon 15 from icon 111 is 4, the control section 110 move the pointer from icon 15 to icon 14 because the minimum combined frequency of selection of the directional keys to reach icon 5 from icon 11 is 3, which is one less than that required for icon 15.

In the meantime, when the RIGHT key 33 or UP key 34 is selected in a state in which the pointer is positioned at icon 7, i.e., the rightmost menu icon of the first row of the menu matrix 210, the control section 110 moves the pointer from icon 7 to icon 8. When the RIGHT key 33 is selected in a state in which the pointer is positioned at icon 14, i.e., the rightmost menu icon of the second row of the menu matrix 210, the control section 110 moves the pointer from icon 14 to icon 17. Also, when the RIGHT key 33 or DOWN key 36 is selected in a state in which the pointer is positioned at icon 21, i.e., the rightmost menu icon of the third row of the menu matrix 210, the control section 110 moves the pointer from icon 21 to icon 2.

Referring back to FIG. 1, the control section 110 includes a memory 111 embedded therein, and counts the frequency of selection of a corresponding directional key of each menu icons 250 to store the frequency of use of each menu icons 250 in the memory 111. Also, the control section 110 rearranges menu icons 250 having a higher frequency of use according to information about the frequency of use of each menu icons 250 stored in the memory 111.

At this time, when the OSD 200 is activated or ended, it may be set to automatically rearrange the menu icons 250 having a higher frequency of use and may be set to rearrange the menu icons 250 when a user wants a rearrangement of the menu icons 250. In case of allowing a user to rearrange the menu icons 250, a separate key for rearrangement of the menu icons 250 may be provided to the key inputting section 115 or a key for rearrangement of the menu icons 250 may be provided to the key inputting section 115 through a mutual combination of the menu key 31, the directional keys and the end key 32.

The control section 110 rearranges the menu icons 250 of the menu matrix 210 by a certain rules in case of rearranging the menu icons 250 by either a selection of a user or automatically. The control section 110 disposes menu icon having the highest frequency (e.g., icon 11) of use at a central region of the menu matrix 210 where the pointer is initially positioned, disposes the remaining menu icons (e.g., icons 12, 4, 10 and 18) adjacent to the right/up/left/down sides, in this order, around the central region of the menu matrix according to the order of the frequency of use so that those menu icons having the higher frequencies of use are arranged closer to the central region of the menu matrix than those menu icons having lower frequencies of use. At this time, the reason why the menu icons are arranged in the order of right/up/left/down directions is that a user generally feels a key manipulation according to the order of right/up/left/down directions to be convenient in case of moving the pointer through the key inputting section 115.

Now, a process for adjusting a video signal and the image state of the display section 130 using the OSD 200 will be described hereinafter by way of a preferred embodiment.

There are disposed various menu icons 250 for controlling brightness, contrast, a horizontal position, a vertical position, a horizontal size, a vertical size, concave and convex, distortion (ADV)-control, language, an additional function, zoom (out/in), removal of a screen spot, an initial state, a present mode in use, etc., to the menu matrix 210 of the OSD 200 according to this embodiment.

Here, a contrast adjusting icon used the most by users is disposed at icon 11, i.e., the initial position of the pointer in the menu matrix 210. Second to the contrast adjusting icon, a brightness adjusting icon, a horizontal position adjusting icon and a vertical position adjusting icon, and a horizontal size adjusting icon, which are frequently used by users, are, in order, disposed at icon 12, icon 4, icon 10, and icon 18, respectively, located adjacent to the right/up/left/down sides of icon 11 at the central region of the menu matrix 210.

When a user selects the menu key 31 to activate the OSD 200, the pointer is initially positioned at icon 11 of the contrast adjusting icon. Accordingly, a user can adjust the contrast of the screen immediately when the OSD 200 is activated. Also, where a user desires to control the brightness, the horizontal position, the vertical position, and the horizontal size, he/she depresses the RIGHT/UP/LEFT/DOWN keys once, respectively, to move the pointer from icon 11 to a desired menu icons 250.

When the pointer is moved to adjust a desired display function, the control section 110 stores information about the adjusted menu icons 250 in the memory 111, and compares the frequencies of use of respective menu icons 250 stored in the memory 111 with each other. Then, the control section 110 rearranges the menu icons 250 depending on the compared information about the frequencies of use of respective menu icons 250. For example, if the frequency of use of the brightness adjusting icon designated as icon 12 is larger than that of the contrast adjusting icon designated as icon 11, the control section 110 designates the brightness adjusting icon as icon 11 and designates the contrast adjusting icon as another menu icon corresponding to the frequency of use of the contrast adjusting icon.

In the meantime, where a user desires to select a vertical size adjusting icon designated as icon 13 to adjust the vertical size of the screen, and then desires to adjust an additional function of a menu icon designated as icon 17, he/she could depress the DOWN key 36 once and the LEFT key 35 three times, respectively, to move the pointer from icon 13 to icon 17, however, according to the present invention, when a user need only depress the RIGHT key 33 twice to move the pointer from icon 14 to icon 17.

Therefore, according to the prevent invention, icon 11, or the menu icon at the central region of the menu matrix 210, is set as the initial (default) position of the pointer. As a result, even where the user desires to select is any one of the leftmost menu icons, i.e., icon 1, icon 8 or icon 15, or any one of the rightmost menu icons, i.e., icon 7, icon 14 or icon 21, a distance from icon 111 at the central region of the menu matrix 210 to one of those leftmost or rightmost menu icons is relatively short. Accordingly, a user does not feel the movement distance from icon 11 to one of the leftmost or the rightmost menu icons of the menu matrix 210 to be undesirably long, thus the user does not feel inconvenienced.

Moreover, the OSD 200 is controlled to dispose the menu icons having the higher frequency of use at positions closer to the initial position of the pointer, so that a functions of the menu icons 250 used frequently by a user can be adjusted by a minimum frequency of selections of the directional keys.

Further, when the LEFT key 35 or the RIGHT key 33 of the directional keys is selected to move the pointer from one of the leftmost or rightmost menu icons 250 of the menu matrix 210 in outer directions, i.e., in the left or right directions in the menu matrix 210, the control section 110 moves the pointer from one of the leftmost or rightmost menu icons to a menu icon requiring the number of selections of the key input section one less than that of the leftmost or rightmost menu icon in a row next to that of the leftmost or rightmost menu icon in a predetermined direction. Consequently, the pointer is moved to one of the menu icons 250 which has a relatively higher frequency of use and is closer to the initial position of the pointer, so that there is a stronger possibility that the pointer will be moved to the menu icon which a user desires to select. Therefore, the frequency of manipulation of the directional keys by a user is minimized, thereby seeking user's convenience.

In the meantime, although there has been described above only the menu icons 250 disposed at the menu matrix 210, it will, of course, be understood that the present invention may be equally applied to an arrangement of a sub-menu displayed on the display window 230 upon the selection of one of the menu icons 250, such as an additional function icon (e.g., icon 17).

As can be seen from the foregoing, according to the present invention, the menu icon disposed at the central region of the menu matrix 210 is set as the initial position of the pointer, and when the pointer is moved from one of the leftmost or rightmost menu icons 250 of the menu matrix 210 in outer directions, i.e., in the left or right directions in the menu matrix 210, the control section 110 moves the pointer from the leftmost or rightmost menu icon to a menu icon closer to the initial position of the pointer, thereby minimizing the frequency of selection of the directional keys.

While this invention has been described in connection with what is presently considered to be the most practical and preferred embodiment, it is to be understood that the invention is not limited to the disclosed embodiment, but, on the contrary, it is intended to cover various modifications within the spirit and scope of the appended claims.

What is claimed is:

1. A display device including a display section for displaying a video signal, comprising:
   an on-screen display generating section for generating a menu matrix having a plurality of menu icons arranged in a plurality of rows and columns on the display section, the plurality of menu icons being individually selectable for enabling a user to adjust a display state of the display section;
   a key inputting section adapted to allow a user to select any desired one of the plurality of menu icons; and
   a control section adapted to control a pointer so that the pointer is initially positioned at a menu icon in the central region of the menu matrix upon the initial display of the menu matrix, the pointer indicating a menu icon selected through the key inputting section, said control section determining a frequency of use for each of the menu icons selected by a user via the key inputting section, and disposing the menu icon having the highest frequency of use at the central region of the menu matrix where the pointer is initially positioned.

2. The display device as set forth in claim 1, wherein said control section controls the adjustment of the display state of the display section according to an input signal from the key inputting section.

3. The display device as set forth in claim 1, wherein the plurality of rows of the menu matrix includes at least three rows.

4. The display device as set forth in claim 1, wherein the control section disposes the remaining menu icons around the central region of the menu matrix so that those of the menu icons having higher frequencies of use are arranged closer to the central region of the menu matrix than those of the menu icons having lower frequencies of use.

5. The display device as set forth in claim 4, wherein the control section disposes the four menu icons having the frequencies of use closest in frequency to the menu icon having the highest frequency of use adjacent to said menu icon having the highest frequency of use in an order of right, top, left and bottom sides of said menu icon having the highest frequency of use.

6. The display device as set forth in claim 1, wherein said key inputting section comprises a plurality of directional keys, and each menu icon is reachable from said menu icon in the central region of the menu matrix through a corresponding predetermined number of incremental steps in response to the user's manipulation of said directional keys, those menu icons farthest away, geometrically, from said menu icon in the central region of the menu matrix requiring the most amount of incremental steps to be reached.

7. The display device as set forth in claim 6, wherein said control section moves said pointer from one of the rightmost menu icons to a predetermined menu icon requiring one less incremental step than the number of incremental steps corresponding to said one of the rightmost menu icons, when said control section moves the pointer in a right direction from said one of the rightmost menu icons, said predetermined menu icon being disposed on a left side of said menu matrix with respect to said menu icon in the central region of the menu matrix and in a row adjacent, in a downward looped direction, to the row in which said one of the rightmost menu icons was disposed.

8. The display device as set forth in claim 6, wherein said control section moves said pointer from one of the leftmost menu icons to a predetermined menu icon requiring one less incremental step than the number of incremental steps corresponding to said one of the leftmost menu icons, when said control section moves the pointer in a left direction from said one of the leftmost menu icons, said predetermined menu icon being disposed on a right side of said menu matrix with respect to said menu icon in the central region of the menu matrix and in a row adjacent, in an upward looped direction, to the row in which said one of the leftmost menu icons was disposed.

9. The display device as set forth in claim 6, wherein said control section moves said pointer from a top rightmost menu icon to a predetermined menu icon requiring one less incremental step than the number of incremental steps corresponding to said top rightmost menu icon, when said control section moves the pointer in a right direction or upward direction from said top rightmost menu icon, said predetermined menu icon being disposed on a left side of said menu matrix with respect to said menu icon in the central region of the menu matrix and in a row downwardly adjacent to the row in which said top rightmost menu icon was disposed.

10. The display device as set forth in claim 6, wherein said control section moves said pointer from a bottom rightmost menu icon to a predetermined menu icon requiring one less incremental step than the number of incremental steps corresponding to said bottom rightmost menu icon, when said control section moves the pointer in a right direction or downward direction from said bottom rightmost menu icon, said predetermined menu icon being disposed on a left side of said menu matrix with respect to said menu icon in the central region of the menu matrix and in a top row of the menu matrix.

11. The display device as set forth in claim 6, wherein said control section moves said pointer from a top leftmost menu icon to a predetermined menu icon requiring one less incremental step than the number of incremental steps corresponding to said top leftmost menu icon, when said control section moves the pointer in a left direction or upward direction from said top leftmost menu icon, said predetermined menu icon being disposed on a right side of said menu matrix with respect to said menu icon in the central region of the menu matrix and in a bottom row of the menu matrix.

12. The display device as set forth in claim 6, wherein said control section moves said pointer from a bottom leftmost menu icon to a predetermined menu icon requiring one less incremental step than the number of incremental steps corresponding to said bottom leftmost menu icon, when said control section moves the pointer in a left direction or downward direction from said bottom leftmost menu icon, said predetermined menu icon being disposed on a right side of said menu matrix with respect to said menu icon in the central region of the menu matrix and in a row upwardly adjacent to the row in which said bottom leftmost menu icon was disposed.

13. An on-screen display controlling method of a display device including a display section for displaying a video signal, comprising the steps of:
   generating an on-screen display including a menu matrix having a plurality of menu icons arranged in a plurality of rows and columns, said plurality of menu icons being individually selectable for enabling a user to adjust a display state of the display section;
   generating a pointer for indicating which of said plurality of menu icons is currently selected;
   controlling said pointer so that said pointer is initially positioned at a default menu icon in the central region of the menu matrix when said menu matrix is initially displayed;

determining a frequency of use of each of the menu icons selected by a user to adjust a display state; and setting the menu icon having the highest frequency of use as said default menu icon.

14. The on-screen display controlling method as set forth in claim 13, wherein said menu matrix includes at least three rows.

15. The on-screen display controlling method as set forth in claim 13 further comprising the step of disposing the remaining menu icons around the central region of the menu matrix so that those of the menu icons having higher frequencies of use are arranged closer to the default menu icon than those of the menu icons having lower frequencies of use, such that the four menu icons having the frequencies of use closest in frequency to the frequency of use of the default menu icon are disposed, in order of frequency of use, to be adjacent to said default menu icon in an order of right, top, left and bottom sides of said default menu icon.

16. The on-screen display controlling method as set forth in claim 15 further comprising the step of:

selecting one or more of a plurality of directional keys in a key inputting section of said display device to move the pointer from said default menu icon to any of the remaining menu icons in said menu matrix, wherein each said remaining menu icon is reachable from said default menu icon through a corresponding predetermined number of incremental steps in response to the user's manipulation of said directional keys, those menu icons farthest away, geometrically, from said default menu icon requiring the most amount of incremental steps to be reached.

17. The on-screen display controlling method as set forth in claim 16 further comprising the step of:

selecting a right directional key in said key inputting section of said display device to move the pointer from one of the rightmost menu icons in a right direction; and controlling said pointer to move from said one of the rightmost menu icons to a predetermined menu icon requiring one less incremental step than the number of incremental steps corresponding to said one of the rightmost menu icons, in response to the step of selecting a right directional key, said predetermined menu icon being disposed on a left side of said menu matrix with respect to said default menu icon and in a row adjacent, in a downward looped direction, to the row in which said one of the rightmost menu icons was disposed.

18. The on-screen display controlling method as set forth in claim 16 further comprising the step of:

selecting a left directional key in said key inputting section of said display device to move the pointer from one of the leftmost menu icons in a left direction; and controlling said pointer to move from said one of the leftmost menu icons to a predetermined menu icon requiring one less incremental step than the number of incremental steps corresponding to said one of the leftmost menu icons, in response to the step of selecting a left directional key, said predetermined menu icon being disposed on a right side of said menu matrix with respect to said default menu icon and in a row adjacent, in an upward looped direction, to the row in which said one of the leftmost menu icons was disposed.

* * * * *